3,341,439
PHOTOCHEMICAL PROCESS FOR THE PREPARATION OF CHLORIDE DERIVATIVES OF PARA-TOLUNITRILE
Wolfgang Wolfes, Witten-Bommern, Germany, assignor to Chemische Werke Witten GmbH., Witten (Ruhr), Germany
No Drawing. Filed June 28, 1966, Ser. No. 560,999
Claims priority, application Germany, Nov. 23, 1963, C 31,484; Dec. 17, 1963, C 31,684
9 Claims. (Cl. 204—158)

The present application is a continuation-in-part of copending application Ser. No. 406,885, filed Oct. 27, 1964, and copending application Ser. No. 418,314, filed Dec. 14, 1964, both now abandoned.

The present invention relates to a process for the preparation of chloride derivatives of para-tolunitrile. More particularly, it relates to a process for the preparation of para-cyanobenzyl chloride and para-cyanobenzo trichloride. Even more particularly, the invention relates to a process for the preparation of para-cyanobenzyl chloride and para-cyanobenzo trichloride by the chlorination of para-tolunitrile in an aqueous suspension.

It has been known in the prior art to prepare para-cyanobenzyl chloride by chlorinating para-tolunitrile under the action of light at boiling temperatures [Beilstein, Handbuch der Organischen Chemie, Vierte Auflage, Zweites Ergaenzungswerke Band IX, p. 332 (1949)]. In this process, the chlorination is carried out only up to about 90%, measured after the observed weight increase.

There are many disadvantages to this known process. The chlorination is carried out at temperatures around 200° C., whereby the apparatus in which the chlorination is effected is subjected to a high degree of wear and tear. Furthermore, it is quite easy to obtain a strongly discolored end product unless highly pure para-tolunitrile is used as starting material. In addition, it is very difficult to determine the end point of the reaction since, under the conditions employed, the second hydrogen atom of the methyl group of the para-tolunitrile begins to be substituted by chlorine. On the other hand, if the chlorination is not carried out far enough, i.e., when the degree of chlorination is too low, a large quantity of para-cyanobenzyl chloride remains dissolved in the nonchlorinated para-tolunitrile so that it becomes difficult to separate the starting and end products from each other except by means of a fractional distillation.

On the other hand, it has been known heretofore to prepare orthocyanobenzo trichloride by a further chlorination of ortho-cyanobenzal chloride at the boiling temperature thereof. However, it has not been possible to obtain the corresponding trichloromethyl compound of the para isomer according to the same process.

One of the objects of the present invention is to provide an improved process for the preparation of para-cyanobenzyl chloride which overcomes the disadvantages and deficiencies of the prior art methods.

Another object of the present invention is to provide a process for the preparation of para-cyanobenzo trichloride.

A further object of the invention is to provide a process for the preparation of para-cyanobenzyl chloride and para-cyanobenzo trichloride which may be carried out in an efficacious and economical manner.

A still further object of the invention is to provide a process for the preparation of chloride derivatives of para-tolunitrile which may be carried out in relatively simple apparatus with a minimum amount of wear and tear thereon.

Yet another object of the present invention is to provide a process for producing para-cyanobenzyl chloride as well as para-cyanobenzo trichloride in high purity and good yield.

Still another object of the invention is to provide a process for the preparation of para-cyanobenzyl chloride which permits an effective and easy determination of the end point of the reaction.

These and other objects and advantages of the present invention will become apparent to those skilled in the art from a consideration of the following specification and claims.

In accordance with the present invention, it has been found that para-cyanobenzyl chloride may be prepared in a simple manner by the monochlorination of the methyl group in para-tolunitrile by chlorinating para-tolunitrile in aqueous suspension under the action of light. The reaction is carried out at temperatures of between 0° and 60° C. The preferred reaction temperature range is between 30° and 50° C.

Also in accordance with the present invention, it has been found that para-cyanobenzo trichloride may be prepared simply by completely chlorinating tolunitrile and/or its derivatives which are substituted in the side chain thereof with up to two chlorine atoms, such as, para-cyanobenzyl chloride or para-cyanobenzal chloride, in aqueous suspension under the action of light. This reaction may be carried out at temperatures of between 40° and 70° C. and preferably between 50° and 70° C. Most preferably, the reaction is carried out at temperatures of 60° to 65° C. This procedure thus allows para-cyanobenzo trichloride to be obtained by the complete chlorination of the methyl group of para-tolunitrile.

The para-tolunitrile used as starting material herein is preferably suspended in water at a temperature directly above its melting point of 29.5° C. The amount of water employed may be varied within wide limits. A moderate chlorine stream is introduced into the aqueous suspension of para-tolunitrile under exposure to light, in accordance with the process of the present invention. As a light source to be used while carrying out the chlorination, may be mentioned, by way of example, a 200- or 300-watt lamp or a mercury vapor lamp.

The termination of the reaction of the process according to the present invention may be easily recognized, whether or not it is desired to prepare para-cyanobenzyl chloride or para-cyanobenzo trichloride.

As far as the para-cyanobenzyl chloride is concerned, the temperature drops rapidly when the monochlorination of the methyl group of the starting para-tolunitrile is completed, despite the constant chlorine stream used. Simultaneously, a recrystallization of the end product para-cyanobenzyl chloride is noted. The supernatant hydrochloric acid is decanted off at the end of the reaction and may be utilized again directly in subsequent preparations. The crystal sludge is suctioned off on a suction filter or centrifuged off with a centrifuge. The crude product is pure white and needs only to be washed with ligroin once or twice for further purification. The amount of chlorination, based on the amount of para-tolunitrile employed, is between 80 and 90%. Based on the amount of para-cyanobenzyl chloride obtained, the amount of chlorination is 100%, since the nonreacted para-tolunitrile which is separated as an oil during the suction or centrifugation step may at once be added to the next batch since further chlorination, for even 2 hours, of the crystallized para-cyanobenzal chloride does not give any para-cyanobenzal chloride whatsoever, according to gas chromatographic analysis. Thus, under the conditions of the process of the present invention, an exact end point of the reaction is defined and easily detectable.

This process for the monochlorination of para-tolunitrile is surprising since such a process cannot be used for the osomeric meta compound.

With respect to the para-cyanobenzo trichloride, if it is desired to prepare this compound, the end of the reaction is characterized by a drop to a very slight amount of the proportion of hydrogen chloride contained in the waste gas being given off. At this point, the organic phase is separated from the aqueous phase and is crsytallized by cooling. By recrystallization from suitable organic solvents, such as, for example, petroleum ether or aqueous methanol, the corresponding trichloro methyl compound is obtained in pure form.

The para-cyanobenzyl chloride and para-cyanobenzo trichloride prepared in accordance with the present invention are technically valuable products. For example, para-hydroxymethyl benzoic acid, which is of interest in the preparation of polyester resins by the reaction thereof with dihydric alcohols, can be obtained from para-cyanobenzyl chloride by, for example, hydrolysis. The para-cyanobenzo trichloride may be selectively hydrolyzed to give cyanobenzoic acid by conventional procedures. Para-cyanobenzo trichloride may also be used in preparing starting materials for use in the production of synthetic plastics.

The following examples are given merely as illustrative of the present invention and are not to be considered as limiting.

Example I illustrates the preparation of para-cyanobenzyl chloride.

EXAMPLE I 117 grams of molten para-tolunitrile is suspended, with intensive stirring, in 250 milliliters of water which has been preheated to 35° C. in a 500 milliliter round flask provided with stirrer, thermometer, gas inlet tube and gas outlet attachment. The flask is irradiated from the outside with two 200-watt lamps, and a chlorine stream of about 50 liters per hour is simultaneously introduced into the flask. A brisk formation of hydrogen chloride, which is noted in the waste gas after saturation of the aqueous solution, takes place as the reaction temperature rises to 45–50° C. By varying the chlorine stream, the reaction temperature is adjusted and set at 50° C. The reaction temperature then drops rapidly to room temperature after approximately 1 hour. At the same time, the organic phase crystallizes in the flask. After the temperature has dropped to 20° C., the aqueous phase is decanted off and may be used again for another batch. The residue is effectively suctioned off on a suction filter. The filtrate, which contains 17 grams of oily constituents aside from hydrochloric acid, can be used again concomitantly in the next batch without further treatment. The filter cake obtained is twice suspended in 100 milliliters of ligroin, suctioned off and subsequently freed from solvent residues in an exsiccator. After evaporation of the combined washing solutions, a residue of 3 grams is obtained which also may be added to the next batch.

The yield of para-cyanobenzyl chloride is 125 grams, which is 82.2% of the theoretical yield, based on the amount of para-tolunitrile employed.

*Analysis.*—Calculated: Cl, 23.4%; N, 9.24%. Found: Cl, 23.2%; N, 9.21%.

The following examples shows the preparation of para-cyanobenzo trichloride.

EXAMPLE II 50 grams of para-tolunitrile is stirred with 150 ml. of water at 40° C. in a round flask provided with stirrer, reflux cooler, thermometer, and gas inlet tube. The flask is irradiated from the outside with two 300-watt lamps or with a mercury vapor lamp, and a moderate chlorine stream of about 30 liters per hour is introduced into the flask. After chlorination time of about 2 hours, the temperature is raised to 60–65° C. The chlorination is complete after approximately 7 hours; at this time hardly any hydrogen chloride can be found in the waste gas.

Thereafter, air is blown through the reaction mixture for about 30 minutes in order to remove any unreacted chlorine from the flask. Simultaneously, the flask is cooled from the outside with an ice bath to about 5–10° C. The organic phase then solidifies as a crystalline mass. The white crystals are suctioned off, washed with water until acid-free, and dried in an exsiccator over sulfuric acid.

After a single recrystallization from ligroin or aqueous methanol, pure para-cyanobenzo trichloride is obtained. The product has a melting point of 40–41° C. and a boiling point (17 mm. Hg) of 160–162° C. The yield obtained is 88.6 grams. Relative to the amount of para-tolunitrile employed, this amount is 94% of the theoretical yield.

*Analysis.*—Calculated: Cl, 48.22%; N, 6.36%. Found: Cl, 48.20%; N, 6.39%.

EXAMPLE III 50 grams of para-tolunitrile is heated to 200° C. in a round flask equipped with stirrer, reflux cooler, thermometer, and gas inlet tube. The flask is irradiated from the outside with two 300-watt lamps or with a mercury vapor lamp, and a moderate chlorine stream of about 30 liters per hour is introduced into the flask. After about 3 hours chlorination time, the amount of hydrogen chloride contained in the waste gas is but minimal. The weight increase as a result of the chlorine substitution amounts to 29 grams, which almost corresponds to a substitution of two hydrogen atoms in the methyl group of the para-tolunitrile.

After cooling, 150 ml. of water is added to the chlorination product and both phases, i.e., the organic phase and the aqueous phase, are emulsified at 65° C. with vigorous stirring. Simultaneously, a moderate stream of chlorine is again added under exposure to light. After the aqueous layer has been saturated with hydrogen chloride, the waste gas contains hydrogen chloride; and it is found there until the termination of the chlorination which occurs after about 4 hours. After several hours at 5–10° C., the organic phase becomes completely crystallized. The crystals are suctioned off and purified as described in Example II. The melting point of the obtained product is 40° to 41° C., and the yield amounts to 91% of the theoretical yield.

The invention being thus described, it will be obvious that the same may be varied in many ways. Such variations are not to be regarded as a departure from the spirit and scope of the invention, and all such modifications are intended to be included within the scope of the following claims.

I claim:

1. A process for the preparation of mono- and trichloro derivatives of para-tolunitrile which comprises chlorinating para-tolunitrile in an aqueous suspension under the action of light at a temperature of from 0° to 70° C.

2. A process for the preparation of para-cyanobenzyl chloride which comprises chlorinating para-tolunitrile in an aqueous suspension under the action of light at a temperature of from 0° to 60° C.

3. The process of claim 2, wherein the chlorination is carried out at a temperature of from about 30° to 50° C.

4. A process for the preparation of para-cyanobenzo trichloride which comprises completely chlorinating the methyl group of a compound selected from the group consisting of para-tolunitrile, derivatives of para-tolunitrile having the methyl group thereof substituted with up to two chlorine atoms and mixtures thereof in an aqueous suspension under the action of light at a temperature of from 40° to 70° C.

5. The process of claim 4, wherein the chlorination is carried out at a temperature of from about 50° to 70° C.

6. The process of claim 4, wherein the chlorination is carried out at a temperature of from about 60° to 65° C.

7. The process of claim 4, wherein said compound is para-tolunitrile.

8. The process of claim 4, wherein said compound is para-cyanobenzyl chloride.

9. The process of claim 4, wherein said compound is para-cyanobenzal chloride.

References Cited

UNITED STATES PATENTS

| | | | |
|---|---|---|---|
| 2,435,790 | 2/1948 | Long | 204—158 X |
| 3,235,581 | 2/1966 | De Benneville et al. | 204—158 X |

JOHN H. MACK, *Primary Examiner.*

H. S. WILLIAMS, *Examiner.*